Jan. 29, 1957  J. J. BURLINGHAM  2,779,866
UNDERWATER FISHING LIGHT
Filed June 17, 1954
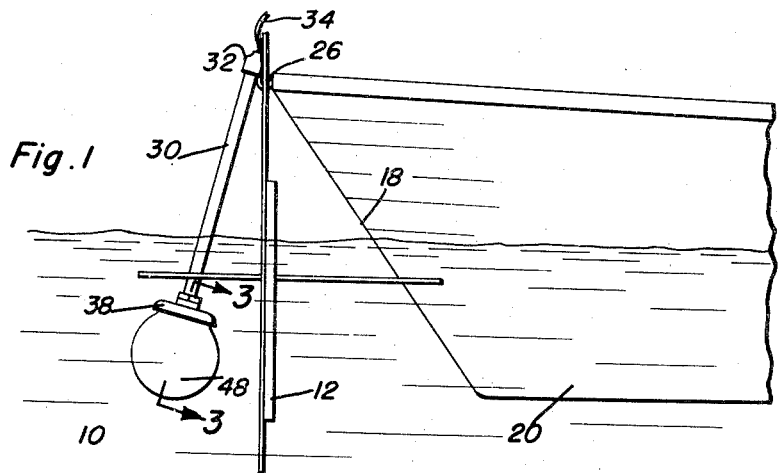
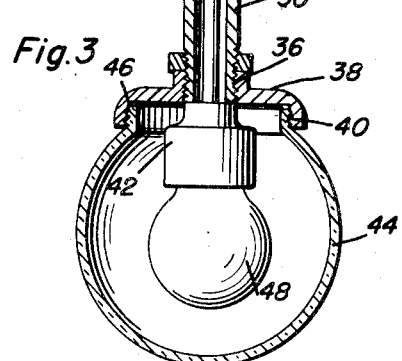
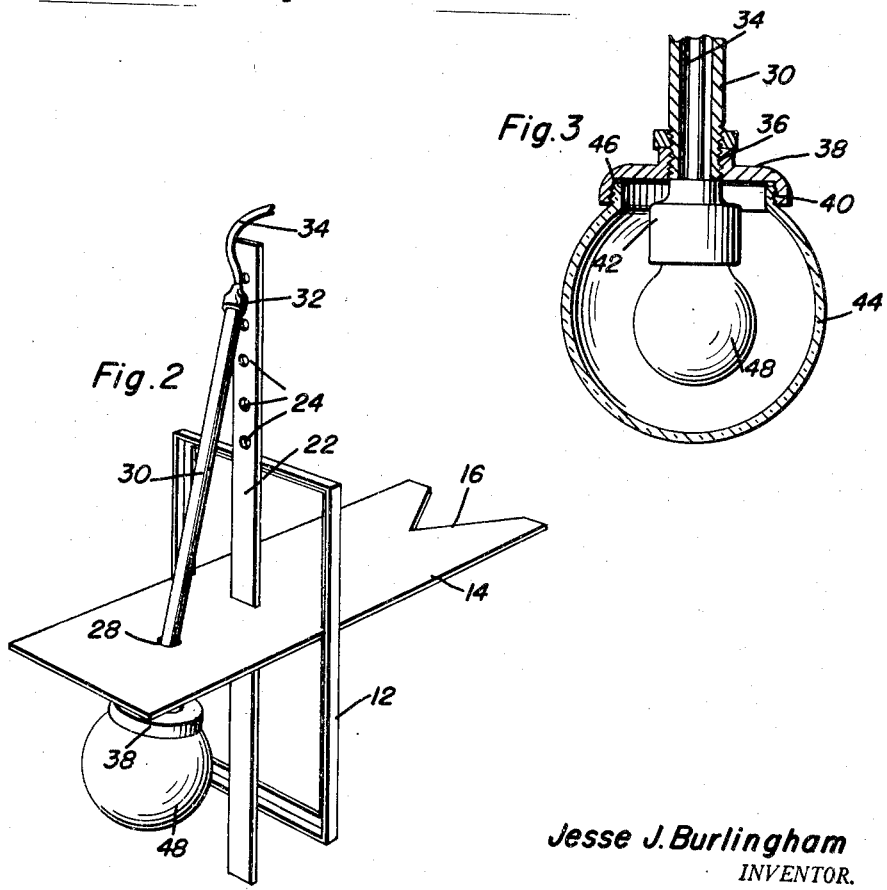
Jesse J. Burlingham
INVENTOR.

United States Patent Office 2,779,866
Patented Jan. 29, 1957

2,779,866
UNDERWATER FISHING LIGHT
Jesse J. Burlingham, Fort Myers, Fla.

Application June 17, 1954, Serial No. 437,377

2 Claims. (Cl. 240—26)

This invention relates to an underwater fishing light adapted for attachment to a boat and has for its particular object the provision of means for supporting a lamp below the surface of the water so as to provide illumination of the waters for a considerable radius so as to enable a fisherman to observe the bottom and surrounding area, thereby assuring the safety of the boat while also enabling greatest success to be attained by the fisherman.

A further object of the invention resides in the provision of illuminating means for fishing at night which is suspended beneath the surface of the water so that the light rays emanating from the source of illumination will not be reflected by the surface of the water, and consequently, greater visibility will be attained.

Still another advantage of the invention resides in the fact that mosquitos and other insects will not be attracted to as great an extent by this fishing light as would be attracted to the annoyance of the fisherman by a lamp mounted above the surface of the water.

The invention is especially adapted for use for such operations as fish spearing at night.

Still further objects and features of this invention reside in the provision of an underwater fishing light that is strong and durable, simple in construction and manufacture, which can be adjustably carried at various depths by boat, and which is inexpensive to produce, thereby permitting wide distribution and utilization.

These, together with the various ancillary objects and features of the invention which will become apparent as the following description proceeds, are attained by this underwater fishing light, a preferred embodiment of which has been illustrated in the accompanying drawings, by way of example only, wherein:

Figure 1 is a side elevational view of the fishing light comprising the present invention;

Figure 2 is a perspective view of the fishing light; and

Figure 3 is an enlarged sectional view, as taken along the plane of line 3—3 in Figure 1.

With continuing reference to the accompanying drawings, wherein like reference numerals designate similar parts throughout the various views, reference numeral 10 generally designates the underwater fishing light comprising the present invention. This underwater fishing light includes a substantially rectangular frame 12 formed of angle-shaped members which has a substantially horizontally extending shield 14 welded or otherwise attached thereto. The shield 14 extends forwardly and rearwardly with respect to the frame 12 and has a substantially triangular-shaped notch 16 therein into which the prow 18 of a boat 20 can be engaged so as to aid in the supporting of this underwater fishing light.

It is to be recognized that the underwater fishing light 10 can be secured to the stern transom of a boat, if such is desired.

Welded or otherwise attached to the frame 12 is a vertically extending bar 22 having a plurality of apertures 24 therein. These apertures are for reception of a hook 26 affixed to the prow 18 of the boat 20, and selective engagement of the hook 26 in one of the apertures 24 will raise and lower the frame 12 and associated elements of the invention to thus adjustably mount the underwater fishing light.

The shield 14 has an angularly extending aperture 28 therethrough and a tube 30 is engaged in the aperture 28 with the upper end portion 32 thereof being in the form of a water-tight resilient member into which conductors 34 extend, the upper end 32 bearing against the bar 22 to hold the tube 30 in position. The base of the tube 30 is externally threaded, as at 36, for reception of an adapter 38 which is internally threaded, as at 40. Further, the conductors 34 extend through the tube 30 and are attached to a lamp socket 42 mounted at the end of the tube 30 inwardly of the adapter 38. Threadedly secured to the adapter 38 is a globe 44 which is arranged in water-tight connection by means of a gasket 46 so as to envelope and encompass the lamp socket 42 as well as a bulb or lamp 48 within the globe 44.

It is to be noted that the shield 14 will prevent a considerable amount of the rays of light emanating from the lamp 48 from passing upwardly, thereby not only increasing the effectiveness of the underwater fishing light, but will decrease the number of insects attracted while permitting greater visibility.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. An underwater fishing light comprising a vertically elongated frame, a substantially horizontally extending shield attached intermediate its ends to an intermediate portion of said frame, a substantially vertically extending bar secured to said frame and extending upwardly through said shield, means for detachably and adjustably attaching said bar to a boat, a tube extending through an aperture provided therefor in said shield and engaging said bar, and illuminating means on the end of said tube and situated beneath said shield, said illuminating means including a lamp socket, a lamp in said socket, and a water-tight globe enveloping said lamp socket and said lamp and secured to said tube.

2. An underwater fishing light comprising a vertically elongated open frame, a substantially horizontally extending shield having an intermediate portion located in and attached to said frame, a substantially vertically extending bar superimposed upon and secured to said frame and extending upwardly through said shield, said bar having a plurality of vertically spaced apertures providing means for adjustably and detachably mounting said bar on a support hook provided therefor on a boat, an angularly disposed tube extending through said shield and engaging said bar, and illuminating means on the lower end of said tube, said illuminating means being confined to a position below and beneath said shield and including a lamp socket, a lamp in said socket, and a water-tight globe enveloping said lamp socket and said lamp and secured to said tube.

References Cited in the file of this patent
UNITED STATES PATENTS

| | | |
|---|---|---|
| 678,467 | Groomes | July 16, 1901 |
| 1,030,052 | Byrne | June 18, 1912 |
| 1,161,939 | Lewis | Nov. 30, 1915 |
| 1,469,034 | Benjamin | Sept. 25, 1923 |